(12) United States Patent
Thomas

(10) Patent No.: US 12,049,146 B2
(45) Date of Patent: Jul. 30, 2024

(54) LARGE VEHICLE AND BOAT POWER INLET MONITORING DEVICE AND SYSTEM

(71) Applicant: Patrick Allan Thomas, Yorba Linda, CA (US)

(72) Inventor: Patrick Allan Thomas, Yorba Linda, CA (US)

(73) Assignee: Hughes Autoformers LLC, Anaheim, CA (US)

( * ) Notice: Subject to any disclaimer, the term of this patent is extended or adjusted under 35 U.S.C. 154(b) by 350 days.

(21) Appl. No.: 17/453,806

(22) Filed: Nov. 5, 2021

(65) Prior Publication Data

US 2022/0281330 A1    Sep. 8, 2022

Related U.S. Application Data

(60) Provisional application No. 63/156,493, filed on Mar. 4, 2021.

(51) Int. Cl.
*B60L 53/16* (2019.01)
*B60L 53/66* (2019.01)
*B60R 16/02* (2006.01)
*H01R 13/717* (2006.01)
*H01R 24/68* (2011.01)

(52) U.S. Cl.
CPC ............... *B60L 53/16* (2019.02); *B60L 53/66* (2019.02); *B60R 16/02* (2013.01); *H01R 13/717* (2013.01); *H01R 24/68* (2013.01); *H01R 2201/26* (2013.01)

(58) Field of Classification Search
CPC .......... B60L 53/16; B60L 53/66; B60R 16/02; H01R 13/717; H01R 13/641; H01R 24/68; H01R 2201/26
See application file for complete search history.

(56) References Cited

U.S. PATENT DOCUMENTS

| | | | | |
|---|---|---|---|---|
| 8,579,635 | B2 * | 11/2013 | Musk ................... | H01R 13/631 439/135 |
| 8,588,050 | B2 * | 11/2013 | Caveney ................ | H01R 24/20 370/200 |
| 8,643,476 | B2 * | 2/2014 | Pinn ....................... | H04Q 1/136 340/687 |
| 9,123,217 | B2 * | 9/2015 | Pinn ......................... | H04Q 1/24 |
| 9,592,543 | B2 * | 3/2017 | Elkins ..................... | E21B 47/00 |
| 9,852,486 | B2 * | 12/2017 | Salter ..................... | G01D 4/002 |
| 10,011,213 | B1 * | 7/2018 | Palmer ................... | G07C 5/008 |

(Continued)

*Primary Examiner* — Thanh Tam T Le
(74) *Attorney, Agent, or Firm* — Price Heneveld LLP

(57) ABSTRACT

A power inlet device and system for use with large vehicles comprising a power connection port; a wireless communication module; a monitoring module; and one or more indicator lights; wherein the monitoring module monitors for error conditions; wherein the error conditions comprise ground not connected, neutral not connected, and reverse polarity; wherein the one or more indicator lights comprise a general status indicator and one or more specific status indicators; wherein the one or more specific status indicators comprise a ground indicator, neutral indicator, and reverse polarity indicator; wherein the one or more specific status indicators are configured to ignite when the monitoring module detects an error condition; wherein the general status indicator is configured to ignite when the monitoring module detects an error condition.

18 Claims, 4 Drawing Sheets

(56) References Cited

U.S. PATENT DOCUMENTS

| | | | |
|---|---|---|---|
| 10,019,880 B1* | 7/2018 | Winters | G08B 5/38 |
| 10,069,250 B2* | 9/2018 | Niwa | H01R 13/707 |
| 10,166,949 B1* | 1/2019 | Selim | B60R 25/102 |
| 10,232,832 B2* | 3/2019 | Wolf | B60T 17/221 |
| 10,348,038 B2* | 7/2019 | Ognjanovski | H01R 13/6397 |
| 10,446,990 B2* | 10/2019 | Dykas | H01R 13/7132 |
| 10,877,529 B2* | 12/2020 | Saravis | G06F 1/1626 |
| 11,065,971 B2* | 7/2021 | Buettner | B60L 53/16 |
| 11,089,662 B2* | 8/2021 | Brinkman | G06F 3/0202 |
| 11,262,816 B2* | 3/2022 | Saravis | F16M 11/105 |
| 11,757,233 B2* | 9/2023 | Kokovidis | A61B 5/273 |
| | | | 439/489 |
| 11,836,020 B2* | 12/2023 | Saravis | G06F 1/1628 |

* cited by examiner

LARGE VEHICLE AND BOAT POWER INLET MONITORING DEVICE AND SYSTEM

CROSS-REFERENCE TO RELATED APPLICATIONS

This Non-Provisional Application claims the benefit of and priority to U.S. Provisional Patent Application No. 63/156,493, filed on Mar. 4, 2021, by inventor Patrick Allan Thomas, the contents of which are expressly incorporated herein by this reference.

BACKGROUND

Large vehicles, such as recreational vehicles (RV) and boats, often have an onboard power supply, such as a battery, that must be replenished via a power inlet. These power inlets are generally configured to receive a large amount of electricity at a relatively high amperage.

The power inlets are generally twist-lock connectors. A power cable runs from an RV park pedestal or dock pedestal to the RV or boat, respectively. The power cable is then placed into the power inlet opening, twisted to lock, and sometimes a threaded sealing ring is used to obtain water resistance.

There are a number of different models of power inlets on the market. However, these power inlets, before the power inlet of the present disclosure, did not offer anything other than a secure electrical connection to a boat or RV.

Because many recreational vehicles are mobile, they are used in various locations rather than a single location that is owned or maintained by the owner of the recreational vehicle. As a result, some of the power sources connected to the recreational vehicle may provide power of an unknown quality. In situations where the quality of the power is poor, the recreational vehicle may be damaged.

Additionally, because the power is introduced to the recreational vehicles via the power source is high, the recreational vehicle may be significantly adversely affected if the poor quality of the power source causes damage that is not quickly noticed.

Thus, there exists a need for owners of recreational vehicles to quickly and easily confirm that the high power source that they connect to via a the power inlet is of a proper quality by quick visual inspection, or to receive notifications when power quality changes while the owner is not in close physical proximity to the vehicle.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

One embodiment may be a power inlet device and system for use with vehicles comprising: a power connection port; a monitoring module; and one or more indicator lights; wherein the monitoring module may be configured to determine characteristics of electricity that flows into the power connection port; and wherein the power connection port may be configured to be on a vehicle. When the characteristics of electricity comprise a deviation from a predetermined electricity quality, the monitoring module may be configured to identify the deviation from the predetermined electricity quality as one or more error conditions. The one or more error conditions may comprise a ground not connected condition, a neutral not connected condition, and a reverse polarity condition. The one or more indicator lights may comprise a general status indicator and one or more specific status indicators. The one or more specific status indicators may comprise a ground indicator, a neutral indicator, and a reverse polarity indicator. The one or more specific status indicators may be configured to illuminate when the monitoring module detects the one or more error conditions. When the ground not connected condition may be identified, the ground not connected indicator may be illuminated; wherein when the neutral not connected condition may be identified, the neutral not connected indicator may be illuminated; and wherein when the reverse polarity condition may be identified, the reverse polarity indicator may be illuminated. The general status indicator may be configured to illuminate when the monitoring module detects any of the one or more error conditions. The power inlet device may further comprise a communication module, and when the monitoring module detects the one or more error conditions, a signal identifying the one or more error conditions may be transmitted to the communication module. Upon receiving the signal identifying the one or more error conditions, the monitoring module may be configured to transmit a data report comprising information about the one or more error conditions to a remote device. The communication module may be a wireless communication module, such that the wireless communication module transmits the data report to the remote device wirelessly. The remote device may be a device selected from the group of devices consisting of one or more of: a mobile phone; a tablet; a computer; and combinations thereof. The communication module may be a wired communication module, such that the wired communication module transmits the data report to the remote device via a wire. The remote device may be at least a portion of an instrument panel of the vehicle.

Another embodiment may be a power inlet device for use with vehicles comprising: a power connection port; a monitoring module; a communication module; and one or more indicator lights; wherein the monitoring module may be configured to determine characteristics of electricity that flows into the power connection port; wherein the power connection port may be on a vehicle; wherein the one or more indicator lights may comprise a general status indicator and one or more specific status indicators; wherein the one or more specific status indicators may comprise a ground indicator, a neutral indicator, and a reverse polarity indicator; wherein the one or more specific status indicators may be configured to illuminate when the monitoring module detects the one or more error conditions; wherein when the ground not connected condition may be identified, the ground not connected indicator may be illuminated; wherein when the neutral not connected condition may be identified, the neutral not connected indicator may be illuminated; and wherein when the reverse polarity condition may be identified, the reverse polarity indicator may be illuminated. When the characteristics of electricity comprise a deviation from a predetermined electricity quality, the monitoring module may be configured to identify the deviation from the predetermined electricity quality as one or more error conditions. The one or more error conditions may comprise a ground not connected condition, a neutral not connected condition, and a reverse polarity condition. The general status indicator may be configured to illuminate when the monitoring module detects any of the one or more error conditions. When the monitoring module detects the one or more error conditions, a signal identifying the one or more error conditions may be transmitted to the communication module; wherein, upon receiving the signal identifying the one or more error conditions, the monitoring module may be configured to transmit a data report comprising information about the one or more error conditions to a remote device; and wherein the communication module may be a wireless communication module, such that the wireless communication module transmits the data report to the remote device wirelessly.

Another embodiment may be a power inlet device and system for use with vehicles comprising: a power connection port; a monitoring module; a communication module; and one or more indicator lights; wherein the monitoring module may be configured to determine characteristics of electricity that flows into the power connection port; wherein the power connection port may be on a vehicle; wherein when the characteristics of electricity comprise a deviation from a predetermined electricity quality, the monitoring module may be configured to identify the deviation from the predetermined electricity quality as one or more error conditions; wherein the one or more error conditions may comprise a ground not connected condition, a neutral not connected condition, and a reverse polarity condition; wherein the one or more indicator lights may comprise a general status indicator and one or more specific status indicators; wherein the one or more specific status indicators may comprise a ground indicator, a neutral indicator, and a reverse polarity indicator; wherein the one or more specific status indicators may be configured to illuminate when the monitoring module detects the one or more error conditions; wherein when the ground not connected condition may be identified, the ground not connected indicator may be illuminated; wherein when the neutral not connected condition may be identified, the neutral not connected indicator may be illuminated; wherein when the reverse polarity condition may be identified, the reverse polarity indicator may be illuminated; wherein the general status indicator may be configured to illuminate when the monitoring module detects any of the one or more error conditions; wherein when the monitoring module detects the one or more error conditions, a signal identifying the one or more error conditions may be transmitted to the communication module; wherein, upon receiving the signal identifying the one or more error conditions, the monitoring module may be configured to transmit a data report comprising information about the one or more error conditions to a remote device; wherein the communication module may be a wireless communication module, such that the wireless communication module transmits the data report to the remote device wirelessly; and wherein the remote device may be a device selected from the group of devices consisting of one or more of: a mobile phone; a tablet; a computer; and combinations thereof.

In accordance with the embodiments disclosed herein, the present disclosure is directed to a large vehicle power inlet monitoring device and system.

In accordance with the embodiments disclosed herein, there may be provided a system for monitoring power flow to vehicles and providing notification via visual indicators and/or wireless communication systems. In some embodiments, the indicators may be auditory, visual, vibratory, or any other method of indicating.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1:
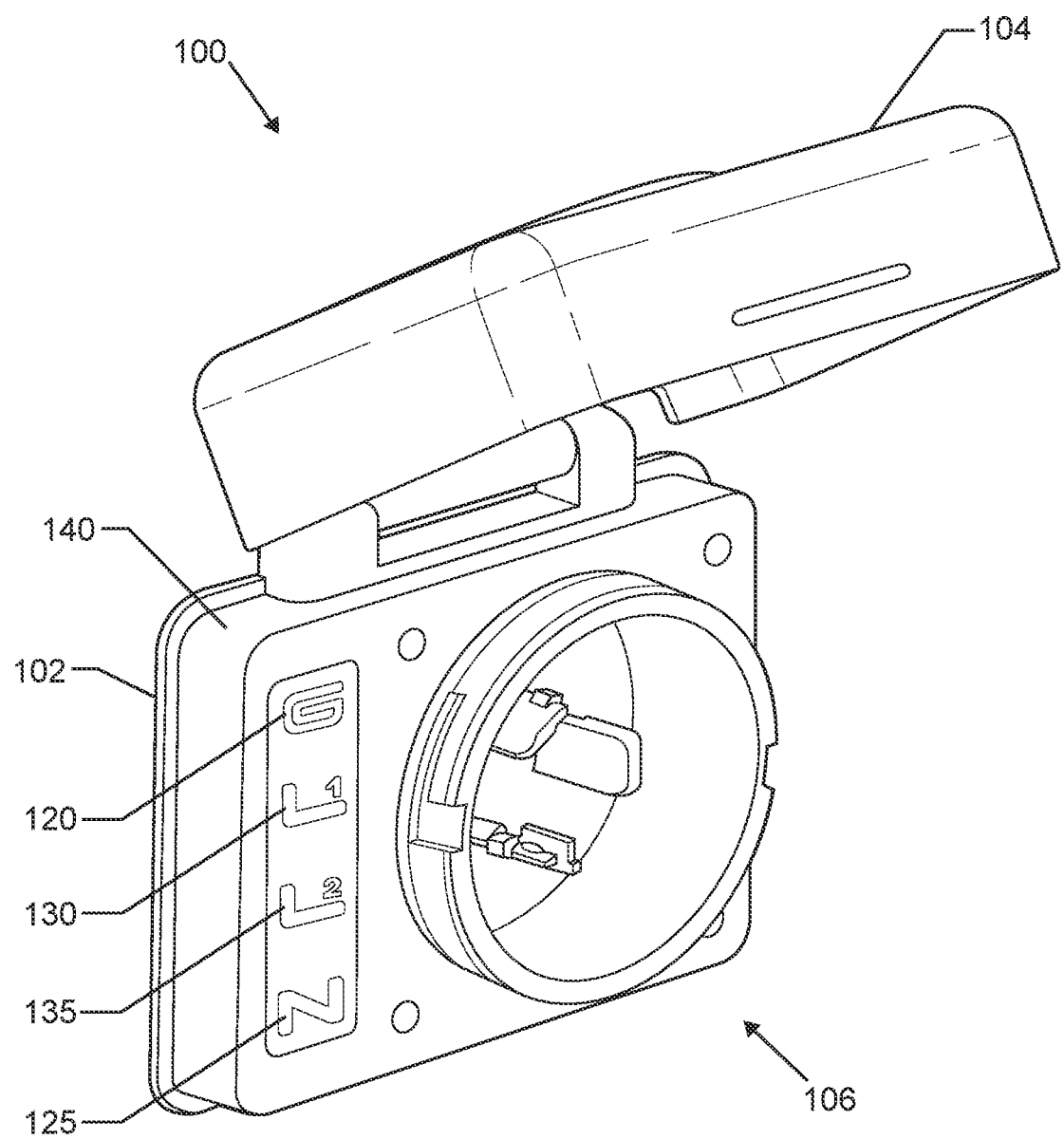
FIG. 1 is an illustration of one embodiment of a power inlet monitoring device.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware embodiments. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-40% from the indicated number or range of numbers.

As used herein, the term "vehicle" is understood to include large vehicles, recreational vehicles, and boats.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

In various implementations, the interactive electronic device may be configured to send and receive messages to other interactive electronic devices, electronic communication devices, and the like.

FIG. 1 is an illustration of one embodiment of a power inlet monitoring device 100. As shown in FIG. 1, the power inlet monitoring device 100 may comprise a base 102, cover 104, power connection port 106, and one or more indicator lights 120, 125, 130, 135, 140. Additionally, the power inlet monitoring device 100 may comprise a monitoring module 110 (shown in FIG. 4) and a wireless communication module 112 (shown in FIG. 4). The power inlet monitoring device 100 may further be adapted to be connected to a power line 114.

The power connection port 106 may comprise ground, neutral, and hot prongs configured to matingly engage a power line, such as power line 114. The power line 114 may be configured to deliver power to a large vehicle through the power inlet monitoring device 100. In a preferred embodiment, the power line 114 may twist and lock into place on the power connection port 106. For example, the power line 114 may comprise a connector such that the power line may engage with power connection port 106 and a user of the power inlet monitoring device 100 may twist power line 114 in order to lock the connector into place in the power connection port 106 such that the power line 114 is prevented from accidentally disconnecting. In some embodiments, the power connection port 106 may comprise different locking engagement mechanisms, or in some embodiments, no locking engagement mechanisms. The power connection port 106 may be of a 2, 3, or 4 pole configuration. The power connection port 106 is preferably one of many standard configurations pursuant to the National Electrical Manufacturers Association (NEMA).

In one embodiment, the monitoring module 110 may monitor each component of the power connection port 106 to ensure proper and expected functioning. In one embodiment, the monitoring module 110 may be configured to continuously monitor the power flow received by the power connection port 106 to determine specific qualities of the power flow. Depending on the specific qualities of the power flow, the one or more indicator lights 120, 125, 130, 135, 140 may be configured to illuminate in response to a determination of the specific qualities of the power flow. In some embodiments, the power supplied to the power connection port 106 may be of an unknown quality to a user until the monitoring module determines the specific qualities of the power flow. In some situations, the user may be utilizing a power supply that provides inconsistent and low-quality power. The monitoring module 110 may be configured to determine qualities of the power flow, such as voltage and amps related to the power flow. In some embodiments, the monitoring module 110 may also determine specific qualities of the power flow such as reverse polarity, open ground, and open neutral conditions. Determining the specific qualities of the power flow may be beneficial to the user because it allows the user to monitor and record power quality, and bad power flow for any extended period of time can have a negative effect on aspects of the recreational vehicle's electrical system. Accordingly, in some embodiments, the power inlet monitoring device 100 may enable real time monitoring of power performance data when aspects of the power supply deviate from expected qualities or are problematic in some other way. Such monitoring may be visualized by the illumination of one or more of the indicator lights 120, 125, 130, 135, 140.

In one embodiment, the indicator lights 120, 125, 130, 135, 140 may comprise a ground indicator light 120, a neutral indicator light 125, a first polarity indicator light 130, a second polarity indicator light 135, and a general status indicator light 140. In one embodiment, if all components of the power connection port 106 are operating as expected and within normal parameters, each of the indicator lights 108 may be green, white, or another preferred color. In one embodiment, if the monitoring module 110 detects an aberration or other issue with the specific qualities of the power flow, such as an issue with the ground, neutral, first polarity, or second polarity, the monitoring module 110 may cause the corresponding indicator light 120, 125, 130, 135, 140 to illuminate a different color, such as red, yellow, or another preferred color. In this way, the indicator lights 120, 125, 130, 135, 140 may comprise one or more color states corresponding to operating within expected parameters or operating outside expected parameters. The indicator lights 120, 125, 130, 135, 140 may also illuminate at varying intensities corresponding to the degree of deviation of the power flow from expected parameters. In one embodiment, the general status indicator light 140 may be a predetermined color, such as green or white when there are no detected issues with the power flow, or may be a different color such as red or yellow if there are any detected issues with the power flow. It is understood that the indicator lights 120, 125, 130, 135, 140 may use substantially any color, with a preference toward consistency of color use. The general status indicator light 140 may be visible even when the cover 104 is in a closed position, such as by being located around a perimeter of the base 102. When the cover 104 is in a closed position, the indicator lights 120, 125, 130, 135 may be covered and not visible until the cover is open 104. In an alternate embodiment, the cover 104 may be configured to only cover the power connection port 106.

In one embodiment, the cover 104 may provide a waterproof or water-resistant seal over the power connection port 106. The cover 104 may be adapted to prevent dust, water, and other particles from entering into and disrupting the function of power inlet monitoring device 100. The cover 104 may also be adapted to prevent unwanted access to the power inlet monitoring device 100. For example, the cover 104 may include a locking mechanism in order to prevent third parties from having unauthorized access to the power inlet monitoring device 100.

Figure 4:
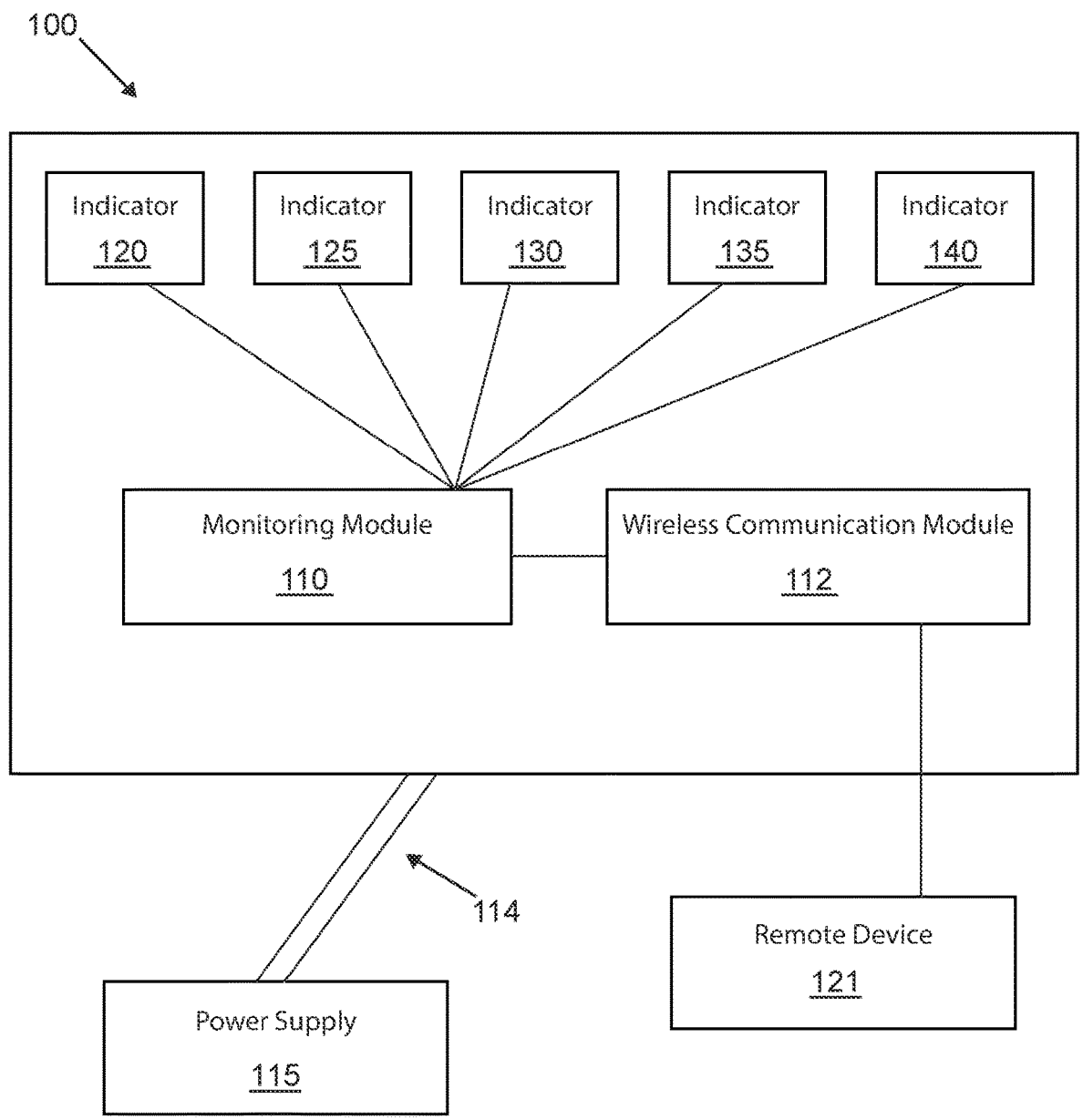
FIG. 4 is a block diagram of one embodiment of a power inlet monitoring device connected to a power supply.

In one embodiment, the wireless communication module 112 may transmit wireless signals and information to a remote device 121 (shown in FIG. 4). In some embodiments the signals transmitted to the remote device 121 may be based on data collected by the monitoring module 110. In some embodiments, the signals transmitted to the remote device 121 may be based on issues detected or determined by the monitoring module 110. In other embodiments, the wireless communication module 112 may be configured to transmit signals to a remote device 121 to confirm normal operation of the power flow. In other embodiments, the wireless communication module 112 may be configured to continually transmit signals to a remote device 121 to provide for a continuous display of the monitoring.

The power inlet monitoring device 100 may preferably be configured for use with large vehicles, such as recreational vehicles and boats. For example, the power inlet monitoring device 100 may be adapted to receive the large three-prong heavy duty 30 amp 120/125 volt (or 240/250 volt) plug associated with recreational vehicles and boats. In some embodiments, power inlet monitoring device 100 may include attachments and adapters such that different plugs of varying voltages, amperages, and connectors may be used.

In some embodiments, the power inlet monitoring device 100 may be mounted on a previously existing power inlet of a large vehicle. In other embodiments, the power inlet monitoring device 100 may replace a previously existing power inlet of a large vehicle.

The power inlet monitoring device 100 may also comprise the wireless communication module 112. The wireless communication module 112 may be in electronic communication (wired or wireless) with the monitoring module 110, such that information regarding the specific details of power flow may be relayed from the monitoring module 110 to the wireless communication module 112, and the specific details of power flow may then be transmitted to a remote device 121 through near field communication technology, WiFi, Bluetooth, cellular service, or any other wireless communication protocol. In one embodiment, the remote device 121 may be configured to receive from the wireless communication module the specific details of the power flow and process the information as necessary or desired. The remote device may be configured to alert the user if the specific details of the power flow indicate that there are any problems with the power flow. In some embodiments, the user may be able to customize when the remote device alerts the user, such as by adjusting the settings to alert the user when the power flow deviates a preset amount from what is expected.

In alternate embodiments the wireless communication module 112 may be replaced or supplemented with a wired communication module. In one embodiment, the wired communication module may communicate with the recreational vehicle onboard communication system.

In some embodiments, the monitoring module 110 may monitor voltage and amps related to the power flow, in addition to monitoring for reverse polarity, open ground, and open neutral conditions. In some embodiments, the monitoring module 110 may be configured to monitor various electric characteristics such as resistance, inductance, capacitance, instant power, and power over time. The monitoring module 110 may be further configured to determine other characteristics of the power flow based on the monitored characteristics.

Figure 2:
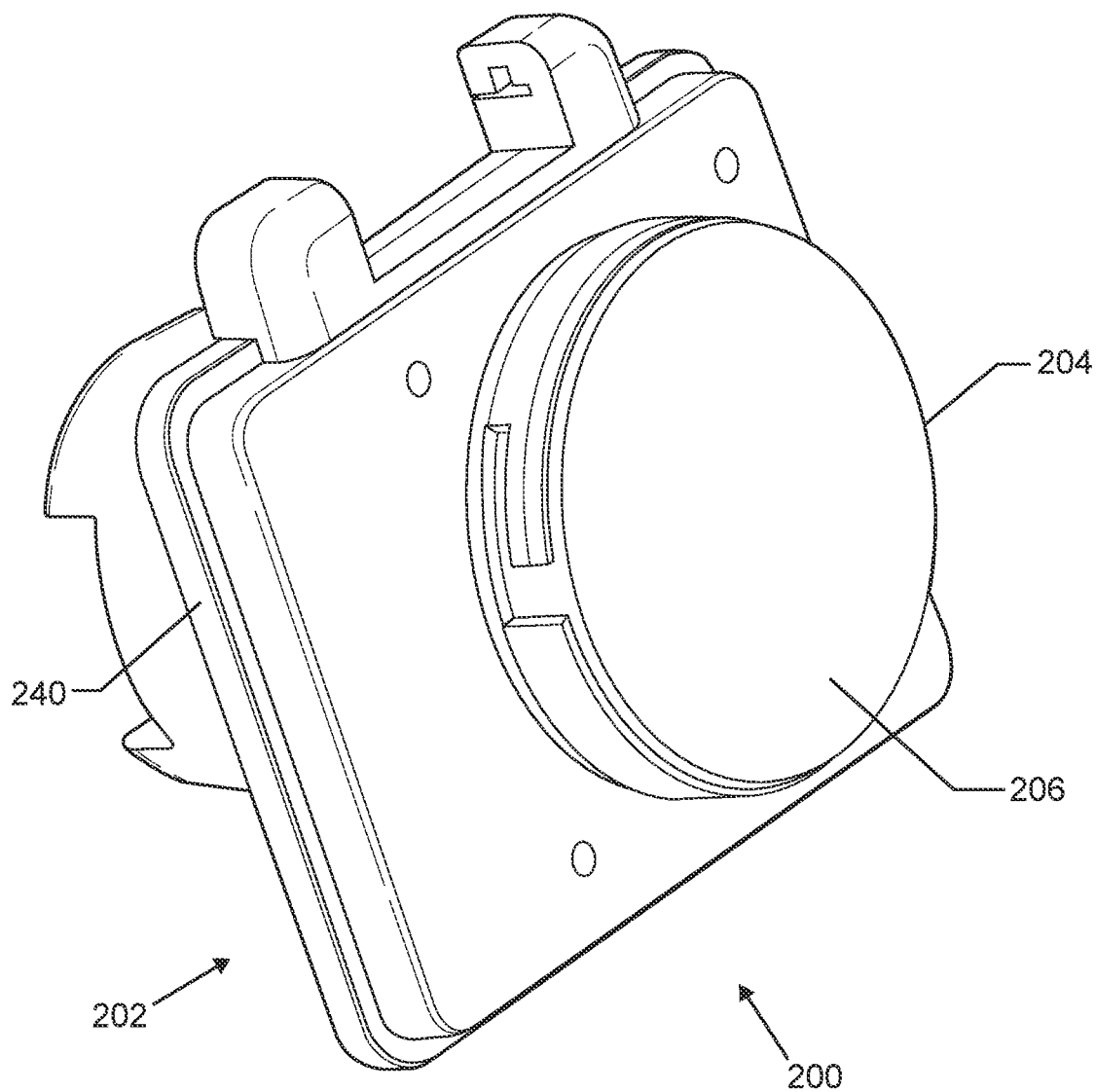
FIG. 2 is an illustration of one embodiment of a power inlet monitoring device.

FIG. 2 is an illustration of one embodiment of a power inlet monitoring device. As shown in FIG. 2, the power inlet monitoring device 200 may be substantially similar to power inlet monitoring device 100, comprising a base 202, cover 204, power connection port 206. The power inlet monitoring device 200 of FIG. 2 more clearly shows a general status indicator 240 with the cover 204 in a closed configuration. In some embodiments, the general status indicator 240 may be a light source that illuminates different colors via a "Halo" effect depending on the condition of the power flow being monitored by a monitoring module (not shown in FIG. 2) of the power inlet monitoring device 200. In some embodiments, the general status indicator 240 may be illuminated based on the specific details of power flow monitored by monitoring module. For example, if the monitoring module detects no abnormalities or other power flow related issues, the general status indicator 240 may illuminate in green, white, or other preferred color. In another embodiment, if the monitoring module detects an abnormality or other power flow related issue, the general status indicator 240 may illuminate in red, yellow, or other preferred color. It is understood that different colors may be used to represent data about power flow collected by the monitoring module.

In some embodiments, the general status indicator 240 may also function as a safety light source to provide light. For example, the illumination from general status indicator 240 may allow a user of power inlet monitoring device 200 to safely unlock the power line from the power inlet monitoring device 200.

Figure 3:
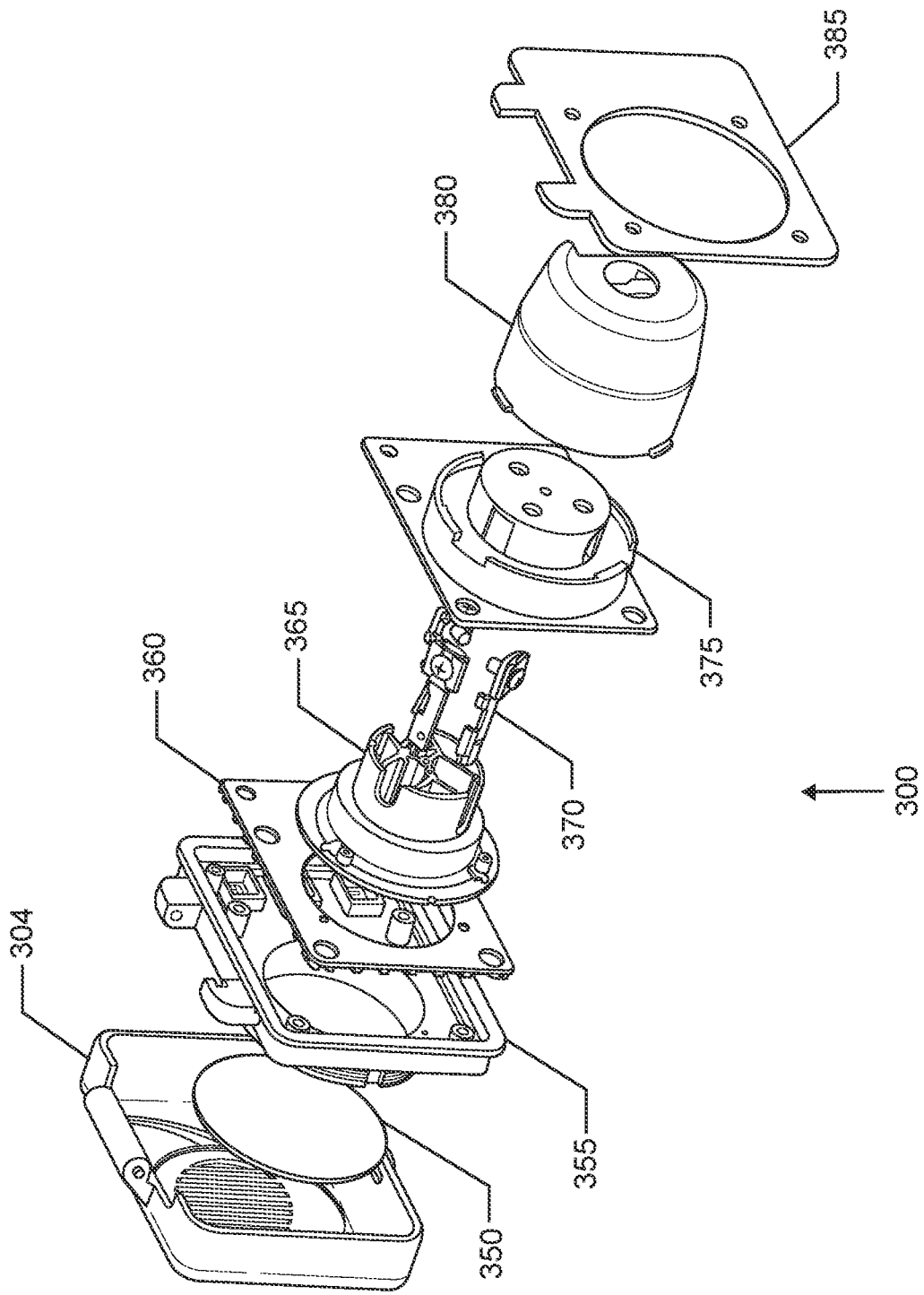
FIG. 3 is an exploded illustration of one embodiment of a power inlet monitoring device.

FIG. 3 is an exploded illustration of one embodiment of a power inlet monitoring device. The power inlet monitoring device 300 may be substantially similar to the power inlet monitoring device 100, and may comprise a cover 304, first waterproof component 350, body 355, printed circuit board (PCB) 360, pin support 365, pin 370, pin cover 375, wire cover 380, and second waterproof component 385.

The waterproof components 350, 385 may be configured and placed to prevent water or other contaminants from entering the housing of the power inlet monitoring device 300. The combination of the pin support 365, pin 370, and pin cover 375 may be configured to in combination receive a plug to receive power. The wire cover 380 may be configured to protect wires that are transferring power to the recreational vehicle. The body 355 may be configured to house the various components of the power inlet monitoring device 300 and/or aid in keeping the components connected. The body may house one or more indicator lights.

The PCB 360 may comprise, or be in communication with, a monitoring module and/or a wireless communication module. The monitoring module and wireless communication module of the PCB 360 may be substantially similar or identical to the monitoring module 110 and wireless communication module 112 of the power inlet monitoring device 100.

In some embodiments, the power inlet monitoring device 300 may comprise a device processor, electronic storage component, and output component. The device processor may be operatively connected to the monitoring module, electronic storage component, and output component. In some embodiments, the output component may be an auditory/visual indicator or a wireless communication module. The wireless communication module may be configured to transmit information generated or detected by the monitoring module to a remote device over a wireless network, Bluetooth, near field communication, or other wireless communication method. In some embodiments, a wired communication method may be used to collect data generated by the monitoring module. In some embodiments, the wireless communication module may be configured to send a signal to a remote device when the monitoring module detects one or more aberrations or issues with power being received by the power inlet monitoring device, or connections related thereto.

FIG. 4 is a block diagram of one embodiment of a power inlet monitoring device connected to a power supply. As shown in FIG. 4, the power inlet monitoring device 100 may be connected to a power supply 115 via a power line 114.

In view of the exemplary systems described herein, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

Those of ordinary skill in the relevant art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

Various embodiments presented in terms of systems may comprise a number of components, modules, and the like. It is to be understood and appreciated that the various systems may include additional components, modules, etc. and/or may not include all of the components, modules, etc. discussed in connection with the figures. A combination of these approaches may also be used.

In addition, the various illustrative logical blocks, modules, and circuits described in connection with certain embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, system-on-a-chip, or state machine. A processor may also be implemented as a combination of computing devices, e.g., a combination of a DSP and a microprocessor, a plurality of microprocessors, one or more microprocessors in conjunction with a DSP core, or any other such configuration.

Operational embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD disk, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC or may reside as discrete components in another device.

Furthermore, the one or more versions may be implemented as a method, apparatus, or article of manufacture using standard programming and/or engineering techniques to produce software, firmware, hardware, or any combination thereof to control a computer to implement the disclosed embodiments. Non-transitory computer readable media may include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Those skilled in the art will recognize many modifications may be made to this configuration without departing from the scope of the disclosed embodiments.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A power inlet device and system for use with vehicles, comprising:
    a power connection port;
    a monitoring module; and
    one or more indicator lights;
    wherein said monitoring module is configured to determine characteristics of electricity that flows into said power connection port;
    wherein said power connection port is configured to be on a vehicle;
    wherein when said characteristics of electricity comprise a deviation from a predetermined electricity quality, said monitoring module is configured to identify said deviation from said predetermined electricity quality as one or more error conditions; and
    wherein said one or more error conditions comprise a ground not connected condition, a neutral not connected condition, and a reverse polarity condition.

2. The power inlet device and system for use with vehicles of claim 1, wherein said one or more indicator lights comprise a general status indicator and one or more specific status indicators.

3. The power inlet device and system for use with vehicles of claim 2, wherein said one or more specific status indicators comprise a ground indicator, a neutral indicator, and a reverse polarity indicator.

4. The power inlet device and system for use with vehicles of claim 3, wherein said one or more specific status indicators are configured to illuminate when said monitoring module detects said one or more error conditions.

5. The power inlet device and system for use with vehicles of claim 4, wherein when said ground not connected condition is identified, said ground not connected indicator is illuminated;
    wherein when said neutral not connected condition is identified, said neutral not connected indicator is illuminated; and
    wherein when said reverse polarity condition is identified, said reverse polarity indicator is illuminated.

6. The power inlet device and system for use with vehicles of claim 2, wherein said general status indicator is configured to illuminate when said monitoring module detects any of said one or more error conditions.

7. A power inlet device and system for use with vehicles, comprising:

a power connection port;

a monitoring module; and one or more indicator lights;

wherein said monitoring module is configured to determine characteristics of electricity that flows into said power connection port;

wherein said power connection port is configured to be on a vehicle;

wherein when said characteristics of electricity comprise a deviation from a predetermined electricity quality, said monitoring module is configured to identify said deviation from said predetermined electricity quality as one or more error conditions; and a communication module;

wherein when said monitoring module detects said one or more error conditions, a signal identifying said one or more error conditions is transmitted to said communication module.

8. The power inlet device and system for use with vehicles of claim 7, wherein, upon receiving said signal identifying said one or more error conditions, said monitoring module is configured to transmit a data report comprising information about said one or more error conditions to a remote device.

9. The power inlet device and system for use with vehicles of claim 8, wherein said communication module is a wireless communication module, such that said wireless communication module transmits said data report to said remote device wirelessly.

10. The power inlet device and system for use with vehicles of claim 9, wherein said remote device is a device selected from the group of devices consisting of one or more of: a mobile phone; a tablet; a computer; and combinations thereof.

11. The power inlet device and system for use with vehicles of claim 8, wherein said communication module is a wired communication module, such that said wired communication module transmits said data report to said remote device via a wire.

12. The power inlet device and system for use with vehicles of claim 11, wherein said remote device is at least a portion of an instrument panel of said vehicle.

13. A power inlet device for use with vehicles, comprising:

a power connection port;

a monitoring module;

a communication module; and one or more indicator lights;

wherein said monitoring module is configured to determine characteristics of electricity that flows into said power connection port;

wherein said power connection port is configured to be on a vehicle;

wherein said one or more indicator lights comprise a general status indicator and one or more specific status indicators;

wherein said one or more specific status indicators comprise a ground indicator, a neutral indicator, and a reverse polarity indicator;

wherein said one or more specific status indicators are configured to illuminate when said monitoring module detects said one or more error conditions;

wherein when a ground not connected condition is identified, said ground not connected indicator is illuminated;

wherein when a neutral not connected condition is identified, said neutral not connected indicator is illuminated; and wherein when a reverse polarity condition is identified, said reverse polarity indicator is illuminated.

14. The power inlet device and system for use with vehicles of claim 13, wherein when said characteristics of electricity comprise a deviation from a predetermined electricity quality, said monitoring module is configured to identify said deviation from said predetermined electricity quality as said one or more error conditions.

15. The power inlet device and system for use with vehicles of claim 14, wherein said one or more error conditions comprise a ground not connected condition, a neutral not connected condition, and a reverse polarity condition.

16. The power inlet device and system for use with vehicles of claim 15, wherein said general status indicator is configured to illuminate when said monitoring module detects any of said one or more error conditions.

17. The power inlet device and system for use with vehicles of claim 16, wherein when said monitoring module detects said one or more error conditions, a signal identifying said one or more error conditions is transmitted to said communication module;

wherein, upon receiving said signal identifying said one or more error conditions, said monitoring module is configured to transmit a data report comprising information about said one or more error conditions to a remote device; and wherein said communication module is a wireless communication module, such that said wireless communication module transmits said data report to said remote device wirelessly.

18. A power inlet device and system for use with vehicles, comprising:

a power connection port;

a monitoring module;

a communication module; and one or more indicator lights;

wherein said monitoring module is configured to determine characteristics of electricity that flows into said power connection port;

wherein said power connection port is configured to be on a vehicle;

wherein when said characteristics of electricity comprise a deviation from a predetermined electricity quality, said monitoring module is configured to identify said deviation from said predetermined electricity quality as one or more error conditions;

wherein said one or more error conditions comprise a ground not connected condition, a neutral not connected condition, and a reverse polarity condition;

wherein said one or more indicator lights comprise a general status indicator and one or more specific status indicators;

wherein said one or more specific status indicators comprise a ground indicator, a neutral indicator, and a reverse polarity indicator;

wherein said one or more specific status indicators are configured to illuminate when said monitoring module detects said one or more error conditions;

wherein when said ground not connected condition is identified, said ground not connected indicator is illuminated;

wherein when said neutral not connected condition is identified, said neutral not connected indicator is illuminated;

wherein when said reverse polarity condition is identified, said reverse polarity indicator is illuminated;

wherein said general status indicator is configured to illuminate when said monitoring module detects any of said one or more error conditions;

wherein when said monitoring module detects said one or more error conditions, a signal identifying said one or more error conditions is transmitted to said communication module;

wherein, upon receiving said signal identifying said one or more error conditions, said monitoring module is configured to transmit a data report comprising information about said one or more error conditions to a remote device;

wherein said communication module is a wireless communication module, such that said wireless communication module transmits said data report to said remote device wirelessly; and wherein said remote device is a device selected from the group of devices consisting of one or more of: a mobile phone; a tablet; a computer; and combinations thereof.

* * * * *